United States Patent
Fankhauser et al.

(10) Patent No.: US 10,071,723 B2
(45) Date of Patent: Sep. 11, 2018

(54) METHOD AND DEVICE FOR OPERATING A DRIVE TRAIN OF A HYBRID VEHICLE

(75) Inventors: Philip Fankhauser, Stuttgart (DE); Dimitrios Stavrianos, Karlsruhe (DE); Klaus-Juergen Wald, Weil der Stadt (DE); Daniel Raichle, Vaihingen (DE); Torsten Heidrich, Vaihingen/Enz (DE); Martin Wirth, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 1472 days.

(21) Appl. No.: 13/977,220

(22) PCT Filed: Nov. 15, 2011

(86) PCT No.: PCT/EP2011/070105
§ 371 (c)(1),
(2), (4) Date: Sep. 4, 2013

(87) PCT Pub. No.: WO2012/089396
PCT Pub. Date: Jul. 5, 2012

(65) Prior Publication Data
US 2013/0342009 A1   Dec. 26, 2013

(30) Foreign Application Priority Data
Dec. 30, 2010   (DE) .................. 10 2010 064 379

(51) Int. Cl.
*B60W 20/13* (2016.01)
*B60K 6/387* (2007.10)
(Continued)

(52) U.S. Cl.
CPC ............. *B60W 20/13* (2016.01); *B60K 6/387* (2013.01); *B60K 6/46* (2013.01); *B60K 6/52* (2013.01);
(Continued)

(58) Field of Classification Search
CPC .......... B60L 3/0046; B60L 3/00; B60L 7/003; B60L 11/14; B60L 3/003; B60L 3/04;
(Continued)

(56) References Cited

U.S. PATENT DOCUMENTS

| 7,237,634 B2 * | 7/2007 | Severinsky | B60H 1/004 180/65.23 |
| 2005/0068003 A1 * | 3/2005 | Gauthier | B60K 6/445 320/104 |
| 2008/0143286 A1 * | 6/2008 | Egami | B60K 6/445 318/432 |

FOREIGN PATENT DOCUMENTS

| CN | 101678753 | 3/2010 |
| CN | 101687501 | 3/2010 |

(Continued)

OTHER PUBLICATIONS

International Search Report for Application No. PCT/EP2011/070105 dated May 2, 2013 (2 pages).

*Primary Examiner* — Rexford Barnie
*Assistant Examiner* — Thai Tran
(74) *Attorney, Agent, or Firm* — Michael Best & Friedrich LLP

(57) ABSTRACT

The invention relates to a method and a device for operating a drive train (101) of a hybrid vehicle comprising an electrical system (102), the drive train (101) having at least one vehicle drive wheel (105) in addition to one first electrical machine (104) and the first electrical machine (104) being connected to the electrical system (102). According to the invention, in order to stabilize the voltage of the electrical system (102), the first electrical machine (104) is operated without being coupled to the drive wheels (105) of the hybrid vehicle.

16 Claims, 4 Drawing Sheets

(51) Int. Cl.
    *B60W 10/08*     (2006.01)
    *B60K 6/46*     (2007.10)
    *B60K 6/52*     (2007.10)
    *B60W 10/02*     (2006.01)
    *B60W 20/00*     (2016.01)
    *H02J 3/18*     (2006.01)
    *B60L 1/00*     (2006.01)
    *B60L 15/20*     (2006.01)
    *B60L 3/00*     (2006.01)
    *B60L 11/12*     (2006.01)
    *B60L 11/14*     (2006.01)
    *B60L 11/16*     (2006.01)

(52) U.S. Cl.
    CPC ............. *B60L 1/003* (2013.01); *B60L 3/0046* (2013.01); *B60L 11/123* (2013.01); *B60L 11/14* (2013.01); *B60L 11/16* (2013.01); *B60L 15/20* (2013.01); *B60W 10/02* (2013.01); *B60W 10/08* (2013.01); *B60W 20/00* (2013.01); *H02J 3/18* (2013.01); *B60L 2210/40* (2013.01); *B60L 2240/34* (2013.01); *B60L 2240/421* (2013.01); *B60L 2240/423* (2013.01); *B60L 2240/547* (2013.01); *B60L 2260/28* (2013.01); *B60W 2710/248* (2013.01); *B60Y 2400/3086* (2013.01); *Y02E 40/30* (2013.01); *Y02T 10/6217* (2013.01); *Y02T 10/6265* (2013.01); *Y02T 10/645* (2013.01); *Y02T 10/7005* (2013.01); *Y02T 10/7077* (2013.01); *Y02T 10/7241* (2013.01); *Y02T 10/7275* (2013.01)

(58) Field of Classification Search
    CPC ......... B60L 7/06; B60L 2210/40; H02H 9/00; H02H 7/122; H02H 9/04; H02P 3/22; H02P 27/06; H02P 3/18; Y02T 10/642; H02M 7/48; B60K 6/387; B60W 20/13
    USPC ....................................................... 307/10.1
    See application file for complete search history.

(56) References Cited

FOREIGN PATENT DOCUMENTS

| | | |
|---|---|---|
| DE | 1438811 | 2/1969 |
| DE | 102007060691 | 7/2008 |
| EP | 0982828 | 3/2000 |

\* cited by examiner

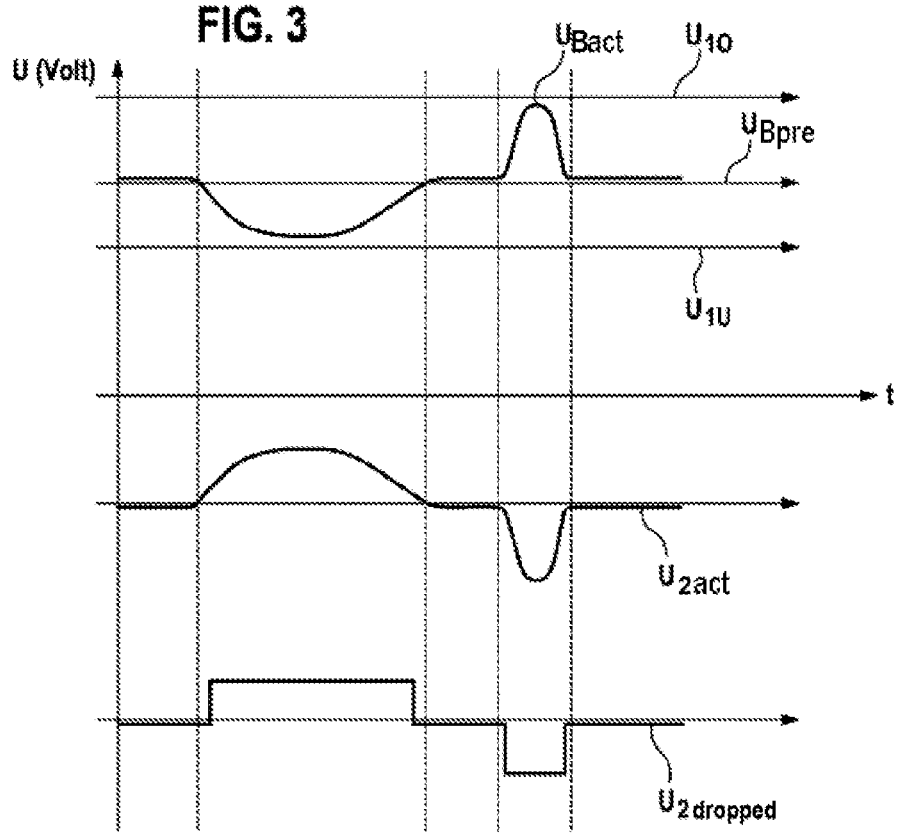
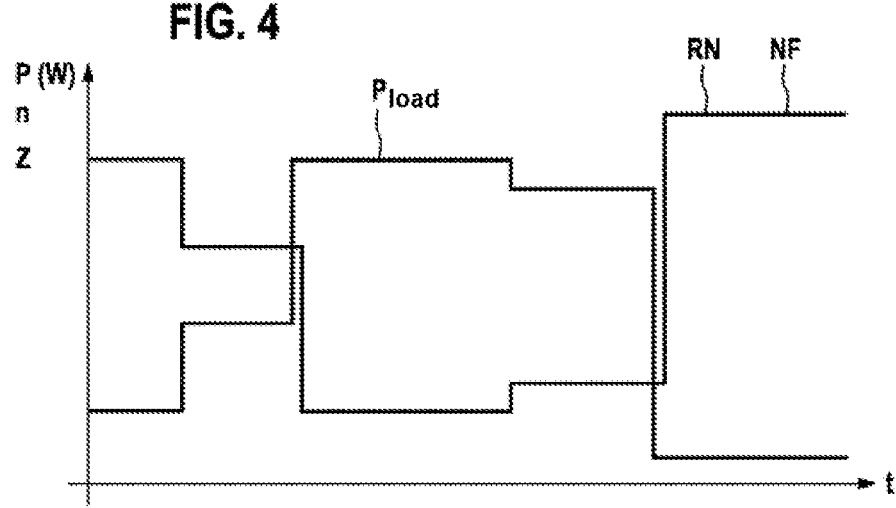

METHOD AND DEVICE FOR OPERATING A DRIVE TRAIN OF A HYBRID VEHICLE

BACKGROUND OF THE INVENTION

The invention relates to a hybrid vehicle comprising a drive train which has two electric machines, wherein both serve to drive the vehicle on one drive axle each, which drive axles are not mechanically coupled to one another, is known as the vehicle RX450h from Lexus. The electrical loads of the vehicle are connected to energy sources via an on-board electrical system. Vehicles with an electric traction drive have a high-voltage on-board electrical system for supplying the electric drive and further high-voltage loads. The high-voltage on-board electrical system is connected to a low-voltage on-board electrical system which serves to supply the low-voltage loads of the vehicle.

It is known to operate one of the electric machines of a hybrid vehicle at certain times in a generator mode in order to generate electrical energy to supply the loads and to charge the energy accumulators. When high-power loads, for example an electrically operated vehicle air-conditioning system, are switched on, on the one hand electrical power peaks are produced, and therefore voltage dips in the on-board electrical system of the vehicle, and on the other hand the rotational speed of the drive train and of the electric machine which is operated in a generator mode collapses since the internal combustion engine does not output within a very short time a significantly increased torque which is necessary for this purpose. When the loads are switched off, voltage peaks and rotational speed overshoots correspondingly occur in the drive train.

In order to reduce this electrical loading of the on-board electrical system and the undesired fluctuations in rotation speed in the drive train during the operation of the hybrid vehicle, different measures are known for stabilizing the voltage, for example buffering energy in the on-board electrical system by means of capacitors.

SUMMARY OF THE INVENTION

The method according to the invention for operating a drive train of a hybrid vehicle is based on a hybrid vehicle comprising an on-board electrical system, wherein an electric machine is connected to this on-board electrical system. The first electric machine can be coupled to a drive train of the vehicle and therefore to a vehicle driven wheel, and respectively decoupled therefrom. For example, the first electric machine serves to drive a vehicle axle. According to the invention there is provision to operate the first electric machine decoupled from a vehicle driven wheel of the hybrid vehicle in order to stabilize the voltage of the on-board electrical system.

The device according to the invention for operating a drive train of a hybrid vehicle is based on a hybrid vehicle comprising an on-board electrical system, wherein an electric machine is connected to this on-board electrical system. The first electric machine can be coupled to a drive train of the vehicle and therefore to a vehicle driven wheel, and respectively decoupled therefrom. For example, the first electric machine serves to drive a vehicle axle. According to the invention, means are provided which actuate the decoupling of the first electric machine from a vehicle driven wheel of the hybrid vehicle and operate said electric machine in order to stabilize the voltage of the on-board electrical system.

A technical exemplary embodiment of this method and of the associated device is that the first electric machine is decoupled from a driven axle specifically for the operating mode for stabilizing the voltage, and is not used for driving the vehicle. The stability of the voltage of the on-board electrical system is therefore advantageously increased. This is necessary, in particular, in the event of failure of any other components which serve to stabilize the voltage.

In a further development of the invention there is provision that in order to stabilize the voltage of the on-board electrical system the first electric machine is operated in such a way that in the normal operating mode said electric machine is operated with a predefined freewheeling rotational speed, and that in the compensation operating mode said electric machine is operated as a generator if the on-board electrical system voltage undershoots a predefined on-board electrical system voltage value. A technical exemplary embodiment of this is that in the normal operating mode kinetic energy is kept available in the first electric machine for stabilizing the voltage by means of operation at a predefined freewheeling rotational speed. In the event of a voltage failure in the on-board electrical system, caused, for example, by activation of an electrical load, the electric machine is operated in a generator mode and braked in the process. In this context, the kinetic energy which is kept available is converted into electrical energy and therefore advantageously counteracts a voltage dip.

In one development of the invention there is provision that in order to stabilize the voltage of the on-board electrical system the first electric machine is operated in such a way that in the normal operating mode said electric machine is operated with a predefined freewheeling rotational speed, and that in the compensation operating mode said electric machine is operated as a motor if the on-board electrical system voltage exceeds a predefined on-board electrical system voltage value. A technical exemplary embodiment of this is that in the normal operating mode kinetic energy is kept available in the first electric machine for stabilizing the voltage by means of operation at a predefined freewheeling rotational speed. In the event of an increase in voltage in the on-board electrical system, caused, for example, as a result of an electrical load being switched off, the electric machine is operated in motor mode and accelerated in the process. In this context, the electric machine takes up the excess electrical energy from the on-board electrical system and converts it into kinetic energy. A further increase in voltage is therefore advantageously counteracted.

In a further development of the invention there is provision that in order to stabilize the voltage of the on-board electrical system the first electric machine is operated in such a way that in the compensation operating mode the generator power is set in such a way that a first lower voltage limiting value of the voltage of the on-board electrical system is not undershot and/or that in the compensation operating mode the motor power is set in such a way that a first upper voltage limiting value of the voltage of the on-board electrical system is not exceeded. A technical exemplary embodiment of this is that the voltage of the on-board electrical system is monitored, and the generator and/or motor power is set as a function of the voltage of the on-board electrical system in such a way that first upper or lower voltage limiting values are not exceeded. Overloading of the on-board electrical system is therefore advantageously avoided.

In a further development of the invention there is provision that the freewheeling setpoint rotational speed is predefined for the first electric machine as a function of an expected change in power of the on-board electrical system. A technical exemplary embodiment of this is that the freewheeling rotational speed is predefined as a function of the largest load which can be activated or the loads which can still be activated simultaneously. As a result, the quantity of energy which is kept available kinetically by means of the electric machine for compensating the voltage dips is set. The normal operating mode of the first electric machine for stabilizing the voltage is therefore advantageously set in a way which is adapted to the requirement situation. Energy-intensive operation at a particularly high freewheeling rotational speed is therefore avoided. In the event of all the loads being activated, the freewheeling rotational speed can be lowered to the stationary state since a voltage dip owing to activation of a load is not to be expected.

In a further development of the invention there is provision that in order to stabilize the voltage of the on-board electrical system the first electric machine is operated in such a way that in the normal operating mode said electric machine is operated as a load resistance with a predefined normal operating mode load resistance value. For this purpose, for example a phase of the first electric machine is connected for a certain time to the on-board electrical system, for example by corresponding switch settings of the power inverter. Over the duration of this activation, which can be varied by actuating the power inverter, the acting normal operating mode load resistance value can be set and predefined. In addition, in the compensation operating mode the effective load resistance value of the first electric machine is increased if the on-board electrical system voltage undershoots a predefined on-board electrical system voltage value and/or in the compensation operating mode the effective load resistance value of the first electric machine is reduced if the on-board electrical system voltage exceeds a predefined on-board electrical system voltage value (UBpre). Over the duration of the connection of, for example, a phase of the first electric machine to the on-board electrical system, which duration can be varied by actuating the power inverter, the acting load resistance value is set. If the duration of the activation is increased, the effective load resistance value is decreased. If the direction of the activation is reduced, the effective load resistance value is increased. A technical exemplary embodiment of this is the connection of, for example, at least one phase of the first electric machine to the on-board electrical system for a certain time, with the result that the first electric machine acts as an electrical impedance in the on-board electrical system. As a result, the first electric machine itself acts as an electrical load of the on-board electrical system. In the event of a voltage drop in the on-board electrical system, caused, for example, by activation of a further electrical load, the duration of the connection of the phase of the first electric machine of the on-board electrical system for a certain time is reduced. In this context, the on-board electrical system is relieved of loading, and a voltage dip is therefore advantageously counteracted. In the event of an increase in voltage in the on-board electrical system, caused, for example, by switching off of a further electrical load, the duration of the connection of the phase of the first electric machine to the on-board electrical system for a certain time is increased. In this context, the electric machine additionally loads the on-board electrical system. A further increase in voltage is therefore advantageously counteracted.

In a further development of the invention there is provision that the normal operating mode load resistance value of the first electric machine is predefined as a function of an expected change in power of the on-board electrical system. A technical exemplary embodiment of this is that the normal operating mode load resistance value is predefined as a function of the largest load which can be activated or of the loads which can still be activated simultaneously. As a result, the power which is kept available by means of the electric machine for compensating the voltage dips is set. The normal operating mode load resistance value of the first electric machine is therefore advantageously set in a way which is adapted to the requirement situation in order to stabilize the voltage. Energy-intensive operation with a particularly high normal operating mode load resistance value is therefore avoided. In the event of all the loads being activated, the normal operating mode load resistance value can be completely eliminated by decoupling from the on-board electrical system since a voltage dip owing to activation of a load is not to be expected.

In a further development of the invention there is provision that a battery, in particular a high-voltage battery, is provided which can be connected to the on-board electrical system, and in a high voltage normal operating mode is used to stabilize the voltage of the on-board electrical system, and in a backup operating mode the method is used to operate a drive train of a hybrid vehicle having an on-board electrical system if the battery does not supply the on-board electrical system with a predefined level of energy. A technical exemplary embodiment of this is that normally the voltage stabilization takes place by means of a battery which is connected to the on-board electrical system. For example, a failure of the battery, for example owing to a defect, or decoupling of this battery from the on-board electrical system can lead to a situation in which the battery no longer supplies the on-board electrical system with a predefined level of energy. In this case, the battery cannot serve to stabilize the voltage either any more. In this case, according to the invention the first electric machine is decoupled from the driven wheels and, as explained above, is operated to stabilize the voltage.

In a further development of the invention there is provision that the drive train also has an internal combustion engine and a second electric machine, and the second electric machine is connected to the on-board electrical system, wherein the internal combustion engine drives the second electric machine so that the latter generates electrical power in a generator mode in order to supply the on-board electrical system. A technical exemplary embodiment of this is that two electric machines which are not connected mechanically to one another are connected to the drive train. The second electric machine can be coupled to an internal combustion engine. In order to generate electrical energy for advantageously supplying the on-board electrical system, the second electric machine is operated in generator mode and is driven by the internal combustion engine.

In a further development of the invention there is provision that in an operating mode A the second electric machine is firstly used to stabilize the voltage of the on-board electrical system, in particular in a voltage regulating mode, and the first electric machine is operated in an operating mode B in order to stabilize the voltage of the on-board electrical system only if the on-board electrical system voltage undershoots a second lower voltage limiting value or exceeds a second upper voltage limiting value. A technical exemplary embodiment of this is that the first electric machine is not used for stabilizing the voltage until the on-board electrical system voltage is outside a range within which the customary measures for stabilizing the voltage are sufficient. This range extends between the second upper and the second lower voltage limiting value. The first electric machine is as a result advantageously decoupled from the vehicle driven wheel less often. This therefore results in a higher level of availability of the electric drive which is driven by the first electric machine.

In a further development of the invention there is provision that in an operating mode C the second electric machine is used to stabilize changes in voltage of the on-board electrical system, wherein these changes in voltage of the on-board electrical system have a frequency which undershoots a first predefined frequency limiting value, and the first electric machine is used to stabilize changes in voltage of the on-board electrical system, wherein these changes in voltage of the on-board electrical system have a frequency which exceeds a second predefined frequency limiting value. In particular, the values of the first and second frequency limiting values can correspond. A technical exemplary embodiment of this is a vehicle having two electric machines, wherein the two electric machines can be subjected to closed-loop control at different speeds, for example owing to their design and their connection in the drive train. The changing of the operating point (for example rotational speed, torque) of the second electric machine which is coupled to the internal combustion engine is slow compared to the changing of the freewheeling first electric machine. Faster, higher-frequency changes in voltage are therefore compensated by means of the first electric machine, and slower, lower-frequency changes in voltage are compensated by means of the second electric machine, with the aim of stabilizing the voltage. The stabilization of the voltage is therefore advantageously optimized.

In a further development of the invention there is provision that a DC/DC converter is provided which serves to couple the on-board electrical system to a second voltage on-board electrical system, wherein the second voltage on-board electrical system is operated at a different voltage than the on-board electrical system, in particular at a lower voltage than the on-board electrical system, and wherein the second voltage on-board electrical system is supplied with energy from the on-board electrical system by means of the DC/DC converter. A technical exemplary embodiment is to equip a hybrid vehicle comprising an on-board electrical system with a relatively high on-board electrical system voltage (traction on-board electrical system, high-voltage on-board electrical system) and a second voltage on-board electrical system with a relatively low on-board electrical system voltage (12 volt on-board electrical system), wherein the second voltage on-board electrical system is connected to the on-board electrical system by means of a DC/DC converter. In this exemplary embodiment, operation of the two on-board electrical systems with a stable voltage, in particular even in the event of failure of the high-voltage battery, is advantageously possible by using the first electric machine to stabilize the voltage.

The illustrated method and the device can be used in hybrid vehicles.

BRIEF DESCRIPTION OF THE DRAWINGS

The invention permits numerous embodiments. A number of these will be explained in more detail with reference to the figures illustrated in the drawings.

In said drawings:

FIG. 3 shows a diagram with voltage profiles in the on-board electrical system, FIG. 4 shows a diagram of the method for stabilizing the voltage.

DETAILED DESCRIPTION

Figure 1:
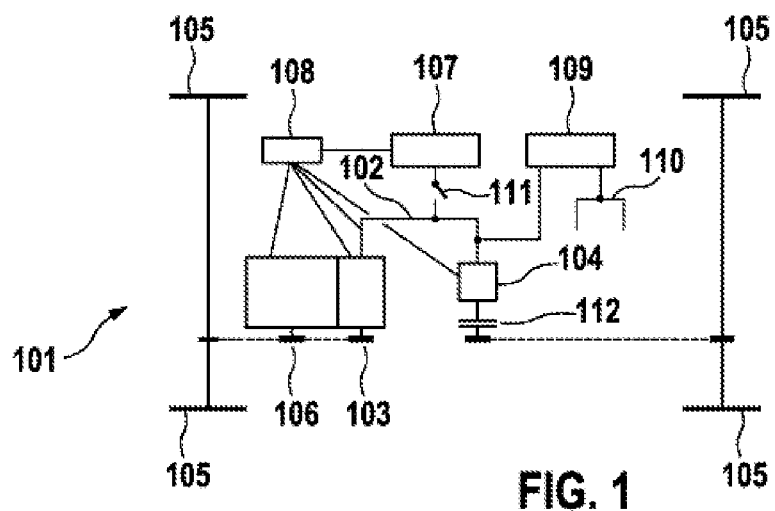
FIG. 1 shows a basic illustration of a vehicle drive train of a vehicle comprising a hybrid drive.

FIG. 1 shows a basic illustration of a vehicle drive train 101 of a vehicle comprising a hybrid drive. The second electric machine 103 and the first electric machine 104 as well as a DC/DC converter 109 are connected to the on-board electrical system 102. The connection of a low-voltage on-board electrical system 110, to which further loads (not illustrated) which can be activated and deactivated are connected, is indicated on the DC/DC converter 109. Furthermore, a high-voltage battery 107 as well as means, for example a control unit 108, for actuating the components (102, 103, 104, 106, 107), are connected to the high-voltage on-board electrical system. The control unit 108 could also be connected to the low-voltage on-board electrical system 110 depending on the electrical embodiment. The second electric machine 103 can be mechanically coupled to the internal combustion engine 106 so that the latter can drive the second electric machine 103. In this context, the second electric machine 103 generates electrical energy in generator mode, for the purpose of supplying the high-voltage on-board electrical system 102. The high-voltage battery 107 can be decoupled from the on-board electrical system by means of a switch 111. The first electric machine 104 can be coupled via a clutch 112 to the vehicle driven wheels 105 in order to drive the vehicle with the rear axle.

Figure 2:
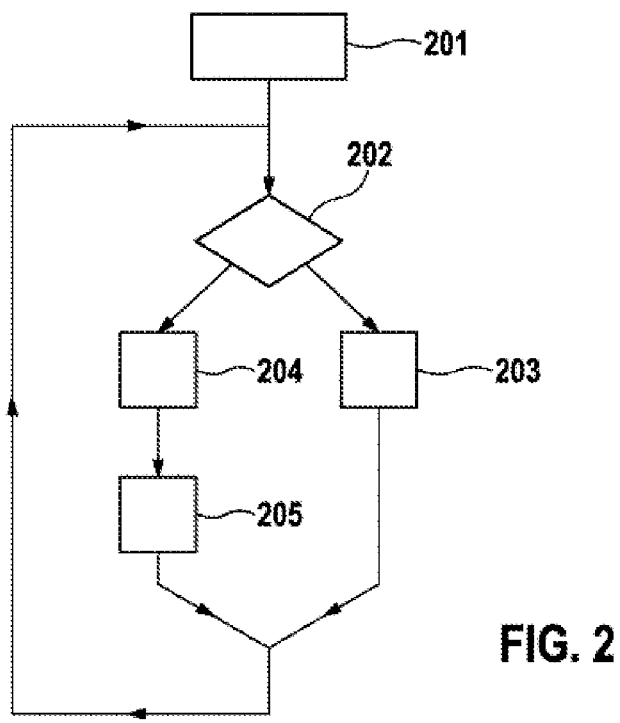
FIG. 2 shows a schematic flow diagram of an exemplary embodiment of the method according to the invention.

FIG. 2 shows a schematic flowchart of an exemplary embodiment of the method according to the invention. The method starts in a first step 201. In a second step 202 it is checked whether a particular operating mode of the drive train is necessary to stabilize the voltage of the high-voltage electrical system. For example, for this purpose the on-board electrical system voltage UBact is measured and it is checked whether the latter deviates from the predefined on-board electrical system voltage value UBpre or predefined limiting values, for example second lower or upper voltage limiting value (U2U, U2O), are undershot or exceeded. On the other hand, a failure or deactivation of the high-voltage battery can also serve as a trigger for initiating the particular operating mode for stabilizing the voltage. If the particular operating mode for stabilizing the voltage is not necessary, the method branches to a third step 203 and the operation is carried on as usual. Subsequently, the method branches again to the second step 202 for renewed testing of the need for the voltage stabilization operating mode. If the operating mode for stabilizing the voltage is necessary, the method branches to a fourth step 204 in which the first electric machine 104 is decoupled from the driven wheels 105. In the following fifth step 205, the first electric machine 104 is used to stabilize the voltage. For this purpose, it is either operated at a predefined freewheeling setpoint rotational speed NF or operated as a load resistance with a normal operating mode load resistance value RN. In the case of voltage fluctuations of the on-board electrical system voltage UBact, the voltage fluctuations are counteracted by actuation for bringing about the generator operating mode or motor operating mode, or by increasing or reducing the impedance of the first electric machine 104. The method subsequently jumps back to the second step 202 in which the need for the particular operating mode for stabilizing the voltage is tested again.

FIG. 3 shows a diagram in which a predefined on-board electrical system voltage value Ubpre and a first lower and a first upper voltage limiting value (U1U, U1O) are represented plotted against the time t. The actual on-board electrical system voltage UBact is also plotted. The profile of the voltage U2act of the first electric machine 104 is also plotted in the diagram in the operating mode for stabilizing the voltage. The voltage U2act is generated by the generator operating mode or motor operating mode in order to compensate the voltage fluctuation of UBact. In addition, the voltage drop U2dropped at the first electric machine 104 is represented, said voltage drop U2dropped occurring when the impedance of the first electric machine 104 is used during the operation to compensate the voltage fluctuation of UBact for the purpose of stabilizing the voltage.

FIG. 4 shows a diagram in which an example of a dependence of the predefined freewheeling rotational speed NF and that of the normal operating mode load resistance value RN on the expected change in power Pload is plotted against the time t. Correspondingly, the Y axis of the diagram is labeled with a P for the power to be represented, with an n for the rotational speed and with a Z for the impedance. The expected change in power Pload is plotted here as the power of the currently connected loads. If the power of the currently connected loads is relatively high, there is a relatively low expected increase in power but a relatively high expected reduction in power, and vice versa. Correspondingly, in the case of a low expected increase in power a low level of kinetic energy for stabilizing the voltage is kept available by means of a low positive predefined freewheeling rotational speed NF of the first electric machine 104, and vice versa. Likewise, in the case of a low expected increase in power a small voltage drop for the purpose of stabilizing the voltage is kept available by means of a low normal operating mode load resistance value RN, and vice versa, if the impedance of the first electric machine is used for stabilizing the voltage.

Figure 5:
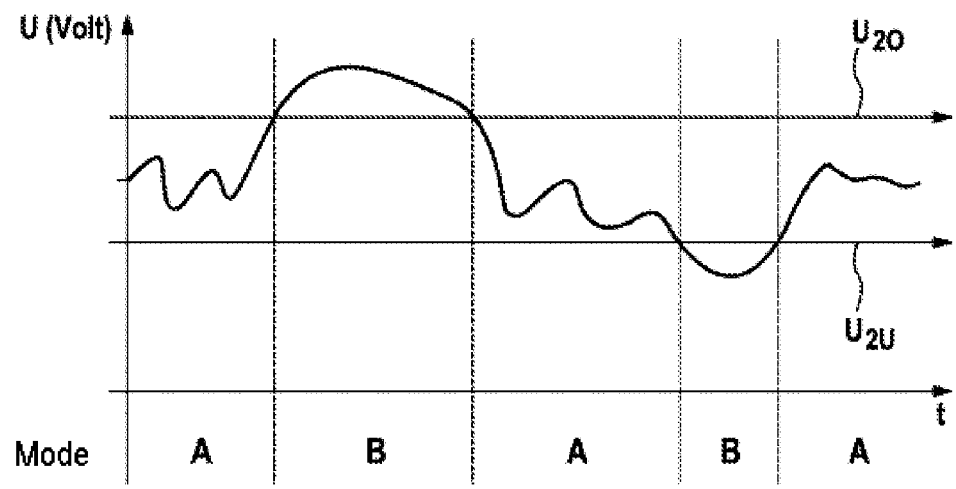
FIG. 5 shows a diagram of different operating modes for stabilizing the voltage.

FIG. 5 shows a diagram in which the different operating modes A and B are plotted against the time t. The operating mode A or B is used depending on the on-board electrical system voltage UBact. If the on-board electrical system voltage UBact undershoots a second lower voltage limit U2U or if the on-board electrical system voltage UBact exceeds a second upper voltage limit U2O, the operating mode B, in which the first electric machine 104 is used to stabilize the voltage, is activated.

Figure 6:
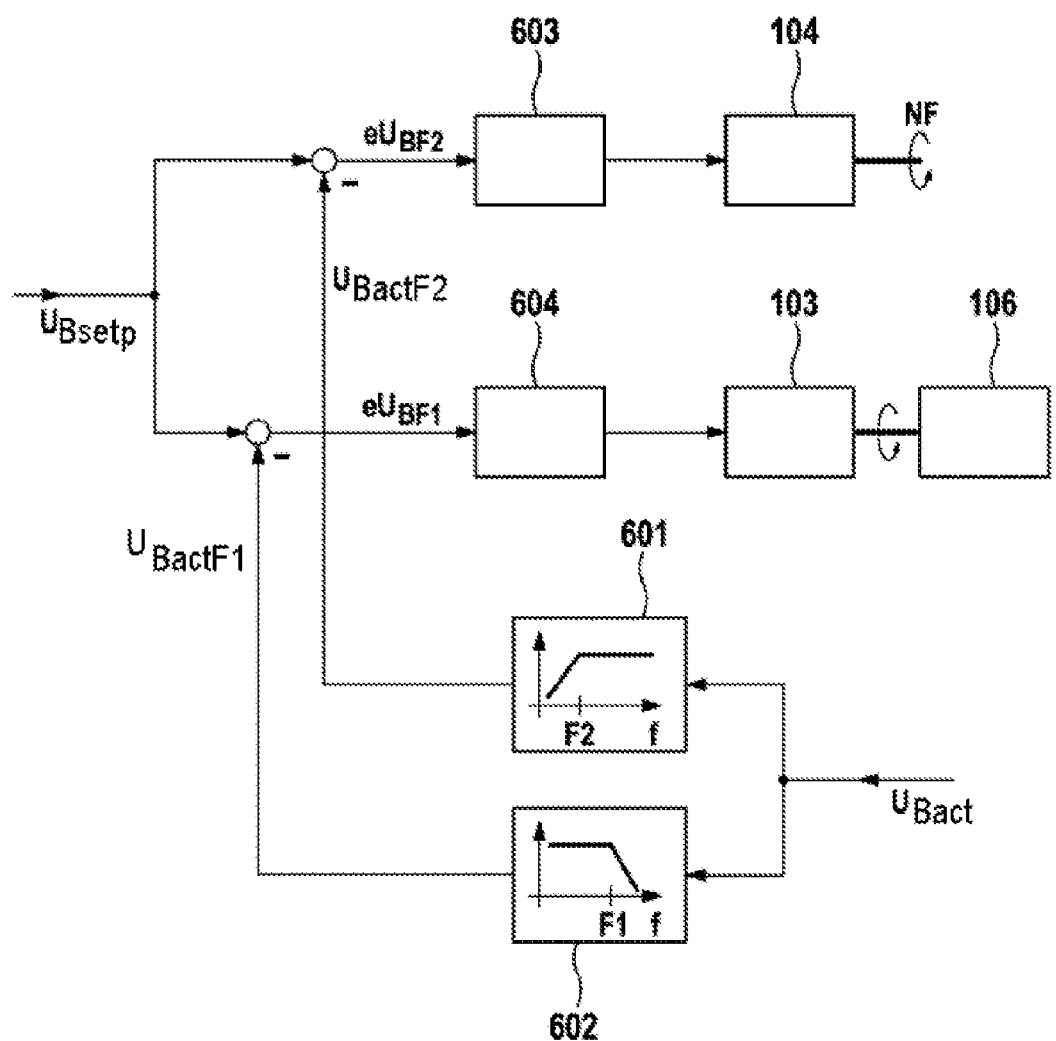
FIG. 6 shows a closed-loop control structure of an exemplary embodiment, taking into account different frequencies during the stabilization of the voltage.

FIG. 6 illustrates a controller structure of an exemplary embodiment in which the second electric machine (103) is used to stabilize changes in the voltage of the on-board electrical system, wherein these changes in voltage of the on-board electrical system have a frequency which undershoots a first predefined frequency limiting value (F1) and the first electric machine (104) is used to stabilize changes in voltage of the on-board electrical system, wherein these changes in voltage of the on-board electrical system have a frequency which exceeds a second predefined frequency limiting value (F2). The controlled variable (Ubact) is split into two controlled variables by means of two frequency filters (601, 602). The first controlled variable (UbactF2) has frequencies above the frequency F2. The second controlled variable (UbactF1) has frequencies below the frequency F1. The respective controlled variables are compared with the reference variable (UBsetp), the setpoint value of the on-board electrical system voltage. The resulting respective control errors (eUBF2, eUBF1) are fed to individual controllers (603, 604). The first controller (603) controls the first electric machine (104) as a function of the control error (eUBF2). In particular, in this context the rotational speed of the first electric machine is influenced. The second controller (604) controls the second electric machine (103) as a function of the control error (eUBF1). In particular, in this context the torque of the second electric machine is influenced. In particular, the values of the first and second frequency limiting values (F1, F2) can correspond. The changing of the operating point (for example rotational speed, torque) of the second electric machine (103), which is coupled to the internal combustion engine (106), is slow compared to the change in the freewheeling first electric machine (104). Relatively fast, relatively high frequency changes in voltage are therefore compensated by means of the first electric machine (104), and relatively slow, relatively low frequency changes in voltage are compensated by means of the second electric machine (103) in the sense of stabilizing the voltage.

The invention claimed is:

1. A method for operating a drive train (101) of a hybrid vehicle comprising an on-board electrical system (102),
    wherein the drive train (101) has at least one vehicle driven wheel (105) and a first electric machine (104), and the first electric machine (104) is connected to the on-board electrical system (102),
    characterized in that
        in order to stabilize a voltage of the on-board electrical system (102), the first electric machine (104) is disconnected from the driven wheels (105) of the hybrid vehicle and is operated in a compensation operating mode when disconnected from the driven wheels (105) as a generator when the voltage of the on-board electrical system (102) undershoots a low-voltage threshold and as a motor when the voltage of the on-board electrical system (102) overshoots a high-voltage threshold.

2. The method as claimed in claim 1, characterized in that in a normal operating mode said electric machine (104) is operated with a predefined freewheeling rotational speed (NF).

3. The method as claimed in claim 2, characterized in that the freewheeling setpoint rotational speed (NF) is predefined for the first electric machine (104) as a function of an expected change in power (Pload) of the on-board electrical system (102).

4. The method as claimed in claim 2, characterized in that in the normal operating mode said electric machine (104) is operated as a load resistance with a predefined normal operating mode load resistance value (RN),
    and in that in the compensation operating mode an effective load resistance value (R1act) of the first electric machine (104) is increased when the on-board electrical system voltage (Ubact) undershoots a predefined on-board electrical system voltage value (UBpre).

5. The method as claimed in claim 4, characterized in that the normal operating mode load resistance value (RN) of the first electric machine (104) is predefined as a function of an expected change in power (Pload) of the on-board electrical system (102).

6. The method as claimed in claim 2, characterized in that in the normal operating mode said electric machine (104) is operated as a load resistance with a predefined normal operating mode load resistance value (RN), and in that in the compensation operating mode an effective load resistance value (R1act) of the first electric machine (104) is reduced if the on-board electrical system voltage (Ubact) exceeds a predefined on-board electrical system voltage value (UBpre).

7. The method as claimed in claim 1, characterized in that in the compensation operating mode the generator power is set in such a way that a first lower voltage limiting value (U1U) of the voltage of the on-board electrical system (102) is not undershot.

8. The method as claimed in claim 1, characterized in that a battery (107) is connected to the on-board electrical system (102), and in a high voltage normal operating mode the battery is used to stabilize the voltage of the on-board electrical system (102), and in a backup operating mode operates the drive train (101) of the hybrid vehicle, if the battery (107) does not supply the on-board electrical system (102) with a predefined level of energy.

9. The method as claimed in claim 1, characterized in that the drive train (101) also has an internal combustion engine (106) and a second electric machine (103), and the second electric machine (103) is connected to the on-board electrical system (102), wherein the internal combustion engine (106) drives the second electric machine (103) so that the second electric machine (103) generates electrical power in a generator mode in order to supply the on-board electrical system (102).

10. The method as claimed in claim 9, characterized in that the second electric machine (103) is firstly used to stabilize the voltage of the on-board electrical system, and the first electric machine (104) is used to stabilize the voltage of the on-board electrical system (102) only if the on-board electrical system voltage (UBact) undershoots a second lower voltage limiting value (U2U).

11. The method as claimed in claim 9, characterized in that the second electric machine (103) is used to stabilize changes in voltage of the on-board electrical system (102), when changes in voltage of the on-board electrical system (102) have a frequency which undershoots a first predefined frequency limiting value (F1), and
the first electric machine (104) is used to stabilize changes in voltage of the on-board electrical system (102), when changes in voltage of the on-board electrical system (102) have a frequency which exceeds a second predefined frequency limiting value (F2).

12. The method as claimed in claim 9, characterized in that the second electric machine (103) is firstly used to stabilize the voltage of the on-board electrical system, and the first electric machine (104) is to stabilize the voltage of the on-board electrical system (102) only if the on-board electrical system voltage (UBact) exceeds a second upper voltage limiting value (U2O).

13. A device for operating hybrid vehicle having an on-board electrical system (102),
wherein a drive train (101) of the hybrid vehicle has at least one vehicle driven wheel (105) and a first electric machine (104), and the first electric machine (104) is connected to the on-board electrical system (102),
wherein a control unit (108) is provided which performs closed-loop control of the operation of the drive train components (102, 104),
characterized in that
in order to stabilize a voltage of the on-board electrical system (102), the first electric machine (104) is disconnected from the driven wheels (105) of the hybrid vehicle and is operated when disconnected from the driven wheels (105) as a generator when the voltage of the on-board electrical system (102) undershoots a low-voltage threshold and as a motor when the voltage of the on-board electrical system (102) overshoots a high-voltage threshold.

14. The device as claimed in claim 13 for operating the drive train (101) of the hybrid vehicle, characterized in that the drive train (101) has a battery (107) which is connected to the on-board electrical system (102), and in a normal operating mode is used to stabilize the voltage of the on-board electrical system (102), and wherein the control unit (108) performs closed-loop control of the operation of the drive train components (102-107, 109) in such a way that in a backup operating mode the drive train (101) of the hybrid vehicle having the on-board electrical system (102) is operated disconnected from the driven wheels (105) as the generator when the voltage of the on-board electrical system (102) undershoots the low-voltage threshold and as the motor when the voltage of the on-board electrical system (102) overshoots the high-voltage threshold if the battery (107) does not supply the on-board electrical system (102) with a predefined level of energy.

15. The device as claimed in claim 13 for operating the drive train (101) of the hybrid vehicle, characterized in that a DC/DC converter (109) is provided which serves to couple the on-board electrical system (102) to a second on-board electrical system (110), wherein the second on-board electrical system (110) is operated at a different voltage than the on-board electrical system (102),
and wherein the second on-board electrical system (110) is supplied with energy from the on-board electrical system (102) by the DC/DC converter (109).

16. The device as claimed in claim 15 for operating the drive train (101) of the hybrid vehicle, characterized in that the second on-board electrical system (110) is operated at a lower voltage than the on-board electrical system (102).

* * * * *